United States Patent
Fujita

(10) Patent No.: US 6,914,725 B2
(45) Date of Patent: Jul. 5, 2005

(54) METHOD AND APPARATUS FOR MANUFACTURING MICRO-LENS ARRAY SUBSTRATE

(75) Inventor: Noboru Fujita, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/642,314

(22) Filed: Aug. 14, 2003

(65) Prior Publication Data

US 2004/0090571 A1 May 13, 2004

(30) Foreign Application Priority Data

Nov. 13, 2002 (JP) ........................................ 2002-330010

(51) Int. Cl.⁷ ............................................ G02B 27/10
(52) U.S. Cl. ........................ 359/619; 359/620; 349/95
(58) Field of Search .............................. 359/619, 620, 359/621, 622, 623, 626; 349/95; 264/1.7, 205, 2.5

(56) References Cited

U.S. PATENT DOCUMENTS

| | | | | |
|---|---|---|---|---|
| 5,536,455 A | * | 7/1996 | Aoyama et al. | 264/1.7 |
| 5,543,942 A | * | 8/1996 | Mizuguchi et al. | 349/5 |
| 5,633,737 A | | 5/1997 | Tanaka et al. | 349/95 |
| 2002/0126390 A1 | * | 9/2002 | Matsushita et al. | 359/621 |
| 2003/0091781 A1 | * | 5/2003 | Arakawa et al. | 428/64.4 |
| 2004/0008411 A1 | * | 1/2004 | Freese et al. | 359/460 |
| 2004/0012734 A1 | * | 1/2004 | Yamanaka et al. | 349/95 |

FOREIGN PATENT DOCUMENTS

JP 2000-147500 5/2000 ......... G02F/1/1335

* cited by examiner

Primary Examiner—Ricky Mack
Assistant Examiner—Brandi Thomas
(74) Attorney, Agent, or Firm—Edwards & Angell, LLP; David G. Conlin

(57) ABSTRACT

A method for manufacturing a micro-lens array substrate according to the present invention includes the steps of: (1) disposing a stamper having a first micro-lens array pattern formed on one surface of the stamper and a second micro-lens array pattern formed on other surface of the stamper between a first transparent substrate and a second transparent substrate facing each other; and (2) removing the stamper, after forming micro-lens arrays which are made of first and second light transmitting resins respectively between the first transparent substrate and the stamper and between the second transparent substrate and the stamper, so as to fix a third light transmitting resin between the two micro-lens arrays, thereby manufacturing a micro-lens array substrate. This eliminates the need for adjustment of optical axes of the micro-lens arrays which are formed respectively on the first and second transparent substrates, thus simplifying the steps for the manufacture of a micro-lens array substrate and realizing efficient mass production of a micro-lens array substrate with a high degree of accuracy.

20 Claims, 7 Drawing Sheets

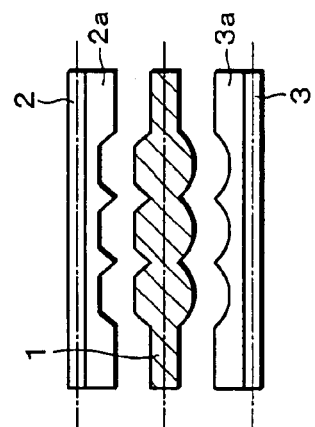
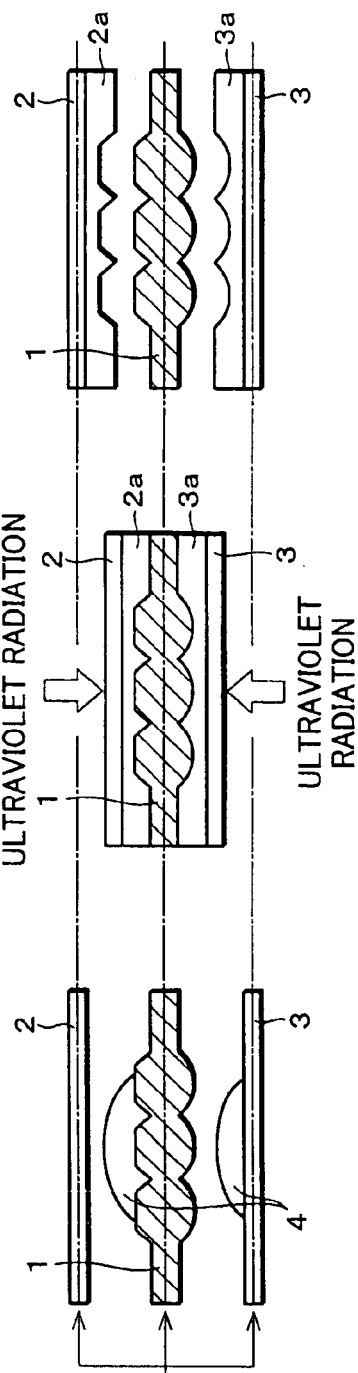
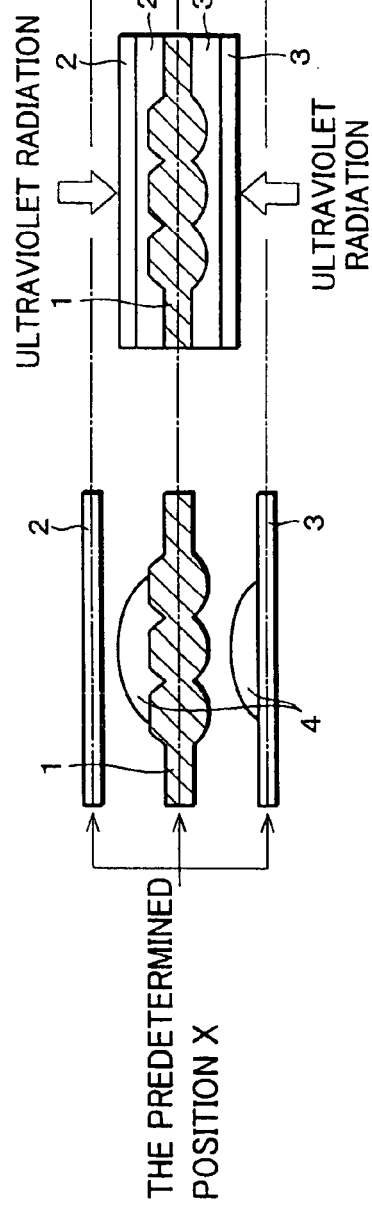
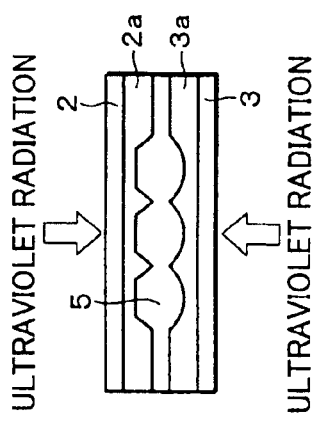
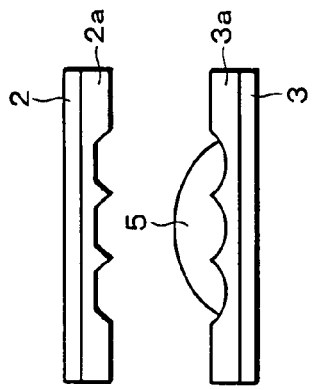
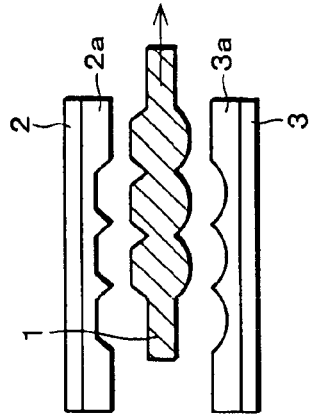

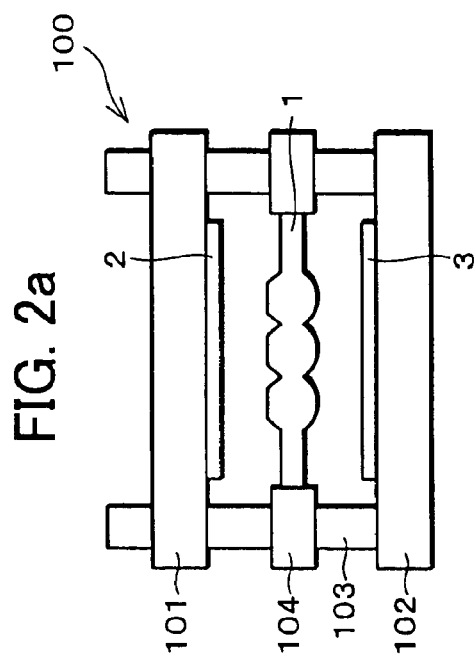
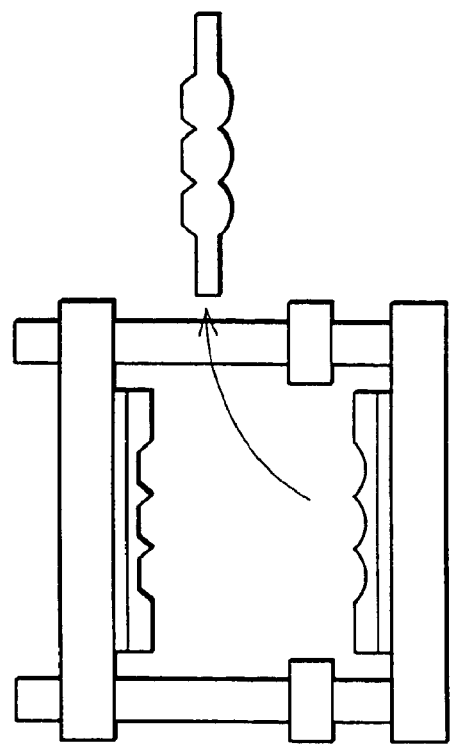
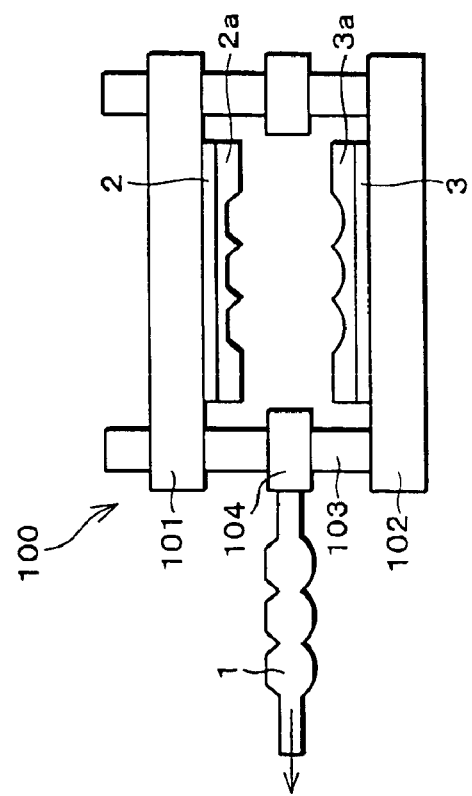

ULTRAVIOLET RADIATION

ULTRAVIOLET RADIATION

METHOD AND APPARATUS FOR MANUFACTURING MICRO-LENS ARRAY SUBSTRATE

FIELD OF THE INVENTION

The present invention relates to a method and apparatus for manufacturing a micro-lens array substrate including a micro-lens as light-focusing element to pixels, for example, in a high-definition liquid crystal display device.

BACKGROUND OF THE INVENTION

Conventionally, it has been known that a liquid crystal display panel is used in a projector for projecting an image onto a screen. In recent years, it has been known in the projector that a micro-lens array substrate including a micro-lens array on a liquid crystal display panel is used to improve the utilization efficiency of light in view of demand for a highly accurate and highly definite image.

FIG. 3 is a front view showing a schematic structure of a liquid crystal projector mounting a conventional micro-lens array substrate. FIG. 4 is a front view showing a substantial part in the micro-lens array substrate of the liquid crystal projector.

As shown in FIGS. 3 and 4, the liquid crystal projector includes a white light source 11, a condensing lens 12, a dichroic mirror 13, a micro-lens array substrate 14, a liquid crystal panel 15, a field lens 16, and a projection lens 17, and the liquid crystal projector projects an image onto a screen 18.

Light emitted from the white light source 11 passes through the condensing lens 12 and turns to parallel light beams. The light beams are illuminated to the dichroic mirror 13. The dichroic mirror 13 is composed of dichroic mirrors 13R, 13G, and 13B of three types, which are disposed with respectively different angles. The dichroic mirrors 13R, 13G, and 13B have such characteristics that they selectively reflect light beams of respective wavelength ranges corresponding to red, green, and blue and transmit the light of other wavelength range. The dichroic mirrors 13R, 13G, and 13B are aligned in the optical axis in the order of red, green, and blue, i.e. in this order.

In the liquid crystal projector, light beams 19 divided by the dichroic mirrors 13R, 13G, and 13B are incident on the micro-lens array substrate 14 at respectively different angles. The light beams 19, which have passed through the micro-lens array substrate 14, pass through the respectively corresponding apertures on the liquid crystal panel 15. Thereafter, the light beams 19 are caused to change their optical axes and projected via the projection lens 17 onto the screen 18.

However, the micro-lens array substrate 14 has the following problems.

After the light beams 19, which have been focused onto the apertures of the liquid crystal panel 15 by the micro-lens array substrate 14, pass through the liquid crystal panel 15, they diverge with great angles in an expanding manner. Without employing a projection lens 17 with a large diameter, this causes a decline in the utilization efficiency of light, resulting in a lowering in picture quality.

In order to solve the above problem, for example, U.S. Pat. No. 5,633,737 (Japanese Laid-Open Patent Publication 181487/1995 (Tokukaihei 7-181487; published on Jul. 21, 1995)) has disclosed, as shown in FIG. 5, that a second micro-lens array 23 is disposed between a liquid crystal panel 21 and a first micro-lens array 22, and the respective optical axes of light beams 24, which has been focused onto the first micro-lens array 22 on the light beam entering side, are changed by the second micro-lens array 23 so as to be parallel to one another in outgoing the second micro-lens array 23, which suppresses divergence of the light beams 24, thus improving the utilization efficiency of light without using a projection lens with a large diameter.

Moreover, for example, Japanese Laid-Open Patent Publication 2000-147500 (Tokukai 2000-147500; published on May 26, 2000) has disclosed a method for manufacturing a double-layer structured micro-lens array substrate.

The following description will be given based on a method for manufacturing the double-layer structured micro-lens array substrate with reference to FIGS. 6a through 6h.

As shown in FIGS. 6a through 6h, first of all, a first ultraviolet-hardening resin 39 is supplied on a stamper 35 formed with a reversal pattern of a first micro-lens array 32 (FIG. 6a). Next, the first ultraviolet-hardening resin 39 is pressed by a glass substrate 37 to spread between the stamper 35 and the glass substrate 37. Thereafter, the first ultraviolet-hardening resin 39 is hardened by ultraviolet irradiation through the glass substrate 37 (FIG. 6b), thereby forming the first micro-lens array 32. Then, the first micro-lens array 32 that has been hardened is separated from the stamper 35 (FIG. 6c).

Additionally, a second micro-lens array 33 is formed in the same manner as the first micro-lens array 32. Specifically, first of all, a first ultraviolet-hardening resin 39 is supplied on a stamper 36 formed with a reversal pattern of the second micro-lens array 33 (FIG. 6d). Next, the first ultraviolet-hardening resin 39 is pressed by a glass substrate 38 to spread between the stamper 36 and the glass substrate 38. Thereafter, the first ultraviolet-hardening resin 39 is hardened by ultraviolet irradiation through the glass substrate 38 (FIG. 6e), thereby forming the second micro-lens array 33. Then, the second micro-lens array 33 that has been hardened is separated from the stamper 36 (FIG. 6f).

Subsequently, a second ultraviolet-hardening resin 40 is supplied on the second micro-lens array 33 that has been formed on the glass substrate 38 (FIG. 6g). The second ultraviolet-hardening resin 40 is pressed by the glass substrate 37 with the first micro-lens array 32 faced down, and a distance between the micro-lens arrays 32 and 33 is adjusted. Thereafter, the second ultraviolet-hardening resin 40 is hardened by ultraviolet irradiation, thereby forming a micro-lens array substrate (FIG. 6h).

However, the following problem occurs in the above-described method for manufacturing a double-layer structured micro-lens array substrate.

Specifically, in the manufacturing method disclosed in Japanese Laid-Open Patent Publication 2000-147500, a micro-lens array substrate is made up in such a manner that the glass substrates 37 and 38 on which the first micro-lens arrays 32 and 33 are respectively provided are separately generated, and thereafter, the two glass substrates are joined together. However, the publication has not disclosed and taught an alignment of the micro-lens arrays. Directly joining the first and second micro-lens arrays 32 and 33 together without some kind of arrangements causes deviation in optical axes and inclination of the first and second micro-lens arrays 32 and 33, resulting in a decline in the utilization efficiency of light and a lowering of resolution due to mixed colors of the light beams.

In order to solve this problem considered is a method of mounting the glass substrates on die sets and joining the glass substrates together. The following description will be given based on concrete examples of a method for manufacturing a micro-lens array using the die sets (first and second methods).

In the first method, as shown in FIGS. 7a through 7c, the glass substrate 37 on which the first micro-lens array 32 is formed is fixed on an upper stage 201 of the die sets, and a glass substrate 38 on which the second micro-lens array 33 is formed is fixed on a lower stage 202 of the die sets (FIG. 7a). After the second ultraviolet-hardening resin 40 is supplied on the glass substrate 38 (FIG. 7b), the upper stage 201 and the lower stage 202 are caused to move closer to each other to spread the second ultraviolet-hardening resin 40 between the first and second micro-lens arrays (FIG. 7c). Thereafter, the second ultraviolet-hardening resin 40 is hardened by ultraviolet irradiation. This arrangement makes it possible to join the glass substrates 37 and 38 together with their parallelism maintained.

Moreover, in the second method for manufacturing a double-layer structured micro-lens array substrate, as shown in FIGS. 8a through 8f, between the upper stage 201 and the lower stage 202 of the die sets, the stampers 35 and 36 are respectively fixed to middle stages 204 which are held movably along a guide pole 203. At this moment, the stampers 35 and 36 are held on the die sets in a state where the respective micro-lens array patterns are subjected to adjustment of optical axes. In the above arrangement, first, the glass substrates 37 and 38 are fixed respectively on the upper stage 201 and the lower stage 202 (FIG. 8a). Secondly, the first ultraviolet-hardening resins 39 are supplied respectively on the stamper 35 and the glass substrate 38 (FIG. 8b), the glass substrate 37 and the stamper 36 are caused to move closer to the stamper 35 and the glass substrate 38, respectively. At this moment, the upper stage 201 and the stampers 35 and 36 are moved in the direction of the lower stage 202 while the lower stage 202 is kept fixed. Then, each of the first ultraviolet-hardening resin 39 spreads between the glass substrate and the stamper (FIG. 8c), and each of the first ultraviolet-hardening resin 39 is hardened by ultraviolet irradiation. Thereafter, the glass substrate 37 and the stamper 36 are separated respectively from the stamper 35 and the glass substrate 38 (FIG. 8d), thereby forming the first micro-lens array 32 and the second micro-lens array 33 on the glass substrates 37 and 38, respectively. Next, the stampers 35 and 36 are removed from the die sets, and the second ultraviolet-hardening resin 40 is supplied on the second micro-lens array 33 that has been formed on the glass substrate 38 (FIG. 8e). Then, the upper stage 201, on which the glass substrate 37 formed with the first micro-lens array 32 is fixed, is caused to move closer to the lower stage 202 so as to spread the second ultraviolet-hardening resin 40 between the first micro-lens array 32 and the second micro-lens array 33 (FIG. 8f). The second ultraviolet-hardening resin 40 is hardened by ultraviolet irradiation, thereby manufacturing a micro-lens array substrate. Such a manufacturing method allows adjusting optical axes and inclination of micro-lens arrays.

However, the first and second manufacturing methods using the die sets cause the following problems.

In the first method, after the micro-lens arrays 32 and 33 are formed respectively on the glass substrates 37 and 38, the glass substrates 37 and 38 are fixed to the die sets. This needs an independent apparatus for forming micro-lens arrays, thus causing a problem of increase in apparatus manufacturing cost. In addition to the above problem, the first method requires adjustment of optical axes every time the glass substrate 37 on which the first micro-lens array 32 is formed and the glass substrate 38 on which the first micro-lens array 33 is formed are joined together. This needs long hours to manufacture a micro-lens array substrate. Therefore, the first method is unfavorable to mass production of a micro-lens array substrate.

Next, in the second. method, manufacturing a micro-lens array substrate is possible in one apparatus. However, after the stampers 35 and 36 are removed from the die sets to join the glass substrates 37 and 38 together, alignment of the stampers 35 and 36 is necessary when they are mounted on the die sets again because the stampers 35 and 36 are provided separately. Therefore, as in the case of the first method, the second method is unfavorable to mass production of a micro-lens array substrate. Moreover, distances between the glass substrate 37 and the stamper 35 and between the glass substrate 38 and the stamper 36 must be increased to remove the stampers 35 and 36, increasing a moving distance of the upper stage 201 and the stamper 35 inside the die sets. This could increase deviation in optical axes and inclination of micro-lens arrays caused during movement of the upper stage 201 and the stamper 35.

SUMMARY OF THE INVENTION

An object of the present invention is to provide a method and apparatus for manufacturing a micro-lens array substrate which can realize mass production of a micro-lens array substrate more easily with less steps for the manufacture than ever.

In order to achieve the above object, in the method for manufacturing a micro-lens array substrate of the present invention in which a stamper formed with micro-lens array patterns is disposed between first and second transparent substrates facing each other, micro-lens arrays which are made of first and second light transmitting resins are formed respectively between the first transparent substrate and the stamper and between the second transparent substrate and the stamper, and thereafter, the stamper is removed to fix a third light transmitting resin between the micro-lens arrays, thereby manufacturing a micro-lens array substrate, movement of the second transparent substrate is restricted only to the direction orthogonal to a substrate surface of the first transparent substrate, and movement of the first transparent substrate is restricted only to the direction orthogonal to a substrate surface of the second transparent substrate, and the stamper has a first micro-lens array pattern formed on one surface of the stamper and a second micro-lens array pattern on the other surface of the stamper.

In order to achieve the above object, in the method for manufacturing a micro-lens array substrate of the present invention in which the stamper having the micro-lens array patterns is disposed between the first and second transparent substrates being held on the die sets and facing each other, and the stamper is removed, after forming the micro-lens arrays which are made of the first and second light transmitting resins respectively between the first transparent substrate and the stamper and between the second transparent substrate and the stamper, so as to fix the third light transmitting resin between the micro-lens arrays, thereby manufacturing a micro-lens array substrate, the stamper has the first micro-lens array pattern formed on one surface of the stamper and the second micro-lens array pattern on the other surface of the stamper.

According to the above arrangement, the micro-lens array substrate is manufactured utilizing the stamper having the micro-lens array patterns on both surfaces of the stamper with respect to the transparent substrates held on the die sets.

Specifically, the first transparent substrate and the second transparent substrate are disposed so as to face each other, the stamper is disposed between the first transparent substrate and the second transparent substrate, and the stamper is taken away after the micro-lens arrays which are made of light transmitting resin are formed on the respective transparent substrates. Then, the third light transmitting resin is fixed between the two micro-lens arrays, thereby manufacturing a micro-lens array substrate. That is, a micro-lens made of the third light transmitting resin is formed between the first micro-lens array and the second micro-lens array. At this moment, the stamper has micro-lens array patterns on both surfaces of the stamper. This eliminates the need for positioning of the respective lens array patterns.

Therefore, as compared with the conventional arrangement in which a micro-lens array substrate is manufactured utilizing the respectively different stampers, it is not necessary to carry out positioning of the stampers when the stamper is attached to the die sets. This makes it possible to manufacture the above substrate more easily with less steps for the manufacture. In addition, it is possible to manufacture the substrate more easily with less steps for the manufacture than ever, thus allowing easier mass production of the substrate.

In order to achieve the above object, in the apparatus for manufacturing a micro-lens array substrate of the present invention in which micro-lens arrays which are respectively made of the first light transmitting resin and the second light transmitting resin are formed respectively on the first transparent substrate and the second transparent substrate, and the third light transmitting resin is fixed between the micro-lens arrays to manufacture a micro-lens array substrate, the apparatus includes:

first holding means and second holding means (holders) for holding the first and second transparent substrates so that they face each other;

stamper holding means (stamper holder) for holding the stamper formed with micro-lens array patterns between the first transparent substrate and the second transparent substrate; and a restriction member for restricting movements of the first holding means, the second holding means, and the stamper holding means to a direction vertical to a substrate surface of the first transparent substrate, the stamper holding means is adapted so that the stamper can be removed from between the first holding means and the second holding means, and the stamper has the first micro-lens array pattern formed on one surface of the stamper and the second micro-lens array pattern formed on other surface of the stamper.

According to the above arrangement, different micro-lens array patterns are formed on both surfaces of the stamper, so that alignment of the micro-lens array patterns is not necessary. Therefore, the above-arranged manufacturing apparatus can manufacture a micro-lens array substrate more easily than the conventional manufacturing apparatus.

For a fuller understanding of the nature and advantages of the invention, reference should be made to the ensuing detailed description taken in conjunction with the accompanying drawings.

BRIEF DESCRIPTION OF THE DRAWINGS

FIG. 1a is a front view showing a step for the manufacture of a micro-lens array substrate of the present invention.

FIG. 1b is a front view showing a step for the manufacture of a micro-lens array substrate of the present invention.

FIG. 1c is a front view showing a step for the manufacture of a micro-lens array substrate of the present invention.

FIG. 1d is a front view showing a step for the manufacture of a micro-lens array substrate of the present invention.

FIG. 1e is a front view showing a step for the manufacture of a micro-lens array substrate of the present invention.

FIG. 1f is a front view showing a step for the manufacture of a micro-lens array substrate of the present invention.

FIG. 2a is a front view showing a schematic structure of an apparatus for manufacturing the micro-lens array substrate.

FIG. 2b is a front view schematically showing a state where a stamper in the apparatus for manufacturing the micro-lens array substrate is removed.

FIG. 2c is a front view schematically showing a conventional manufacturing apparatus for the purpose of comparing the manufacturing apparatus of the present invention with the conventional manufacturing apparatus.

DESCRIPTION OF THE EMBODIMENTS

Figure 3:
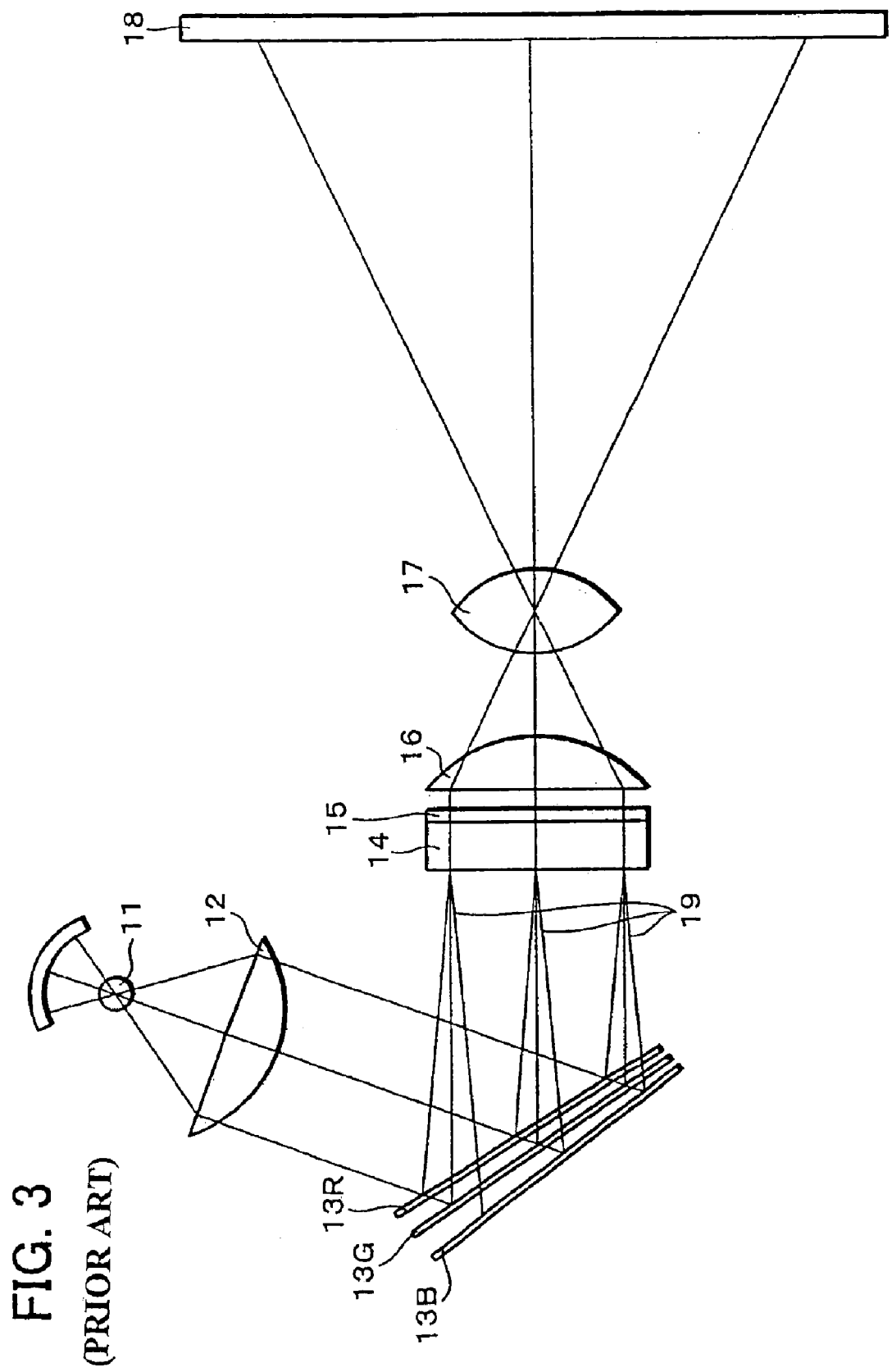
FIG. 3 is a front view showing a structure of a conventional liquid crystal projector.
Figure 4:
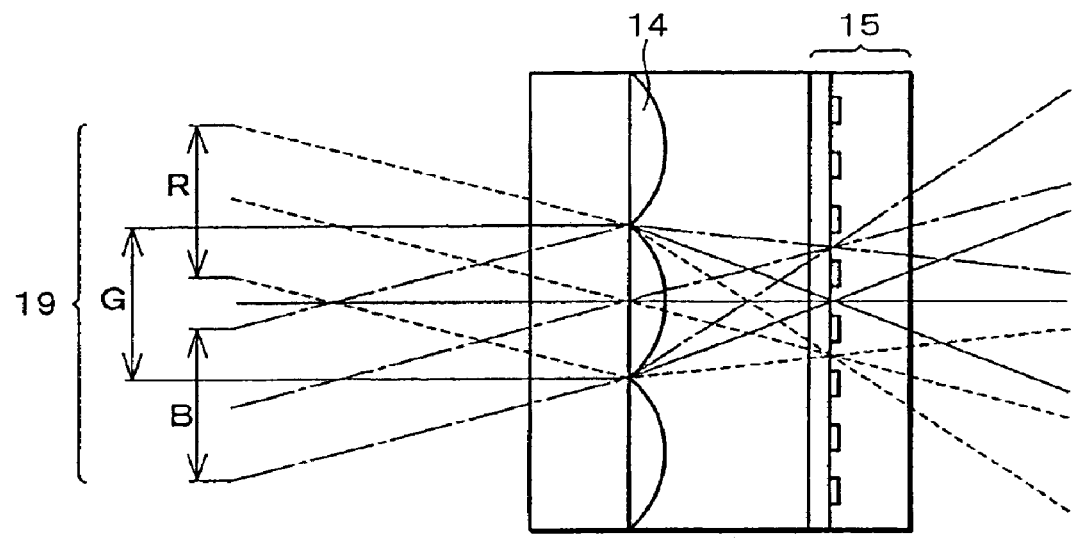
FIG. 4 is a front view showing a structure of a substantial part in a conventional micro-lens array substrate mounted in the conventional liquid crystal projector.
Figure 5:
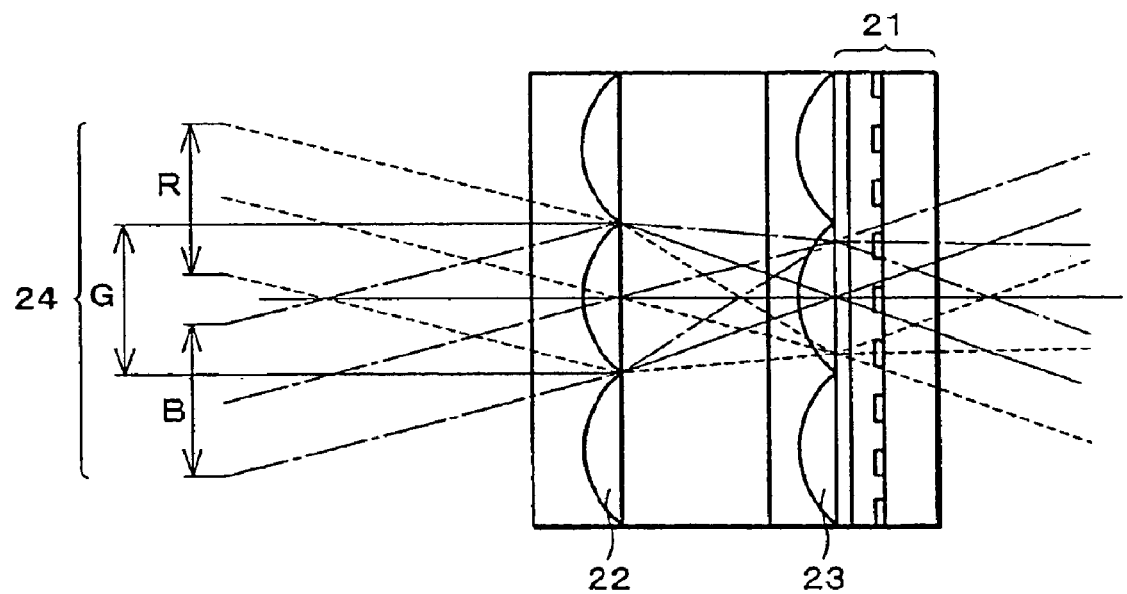
FIG. 5 is a front view showing another structure of the conventional micro-lens array substrate.
Figure 6A:
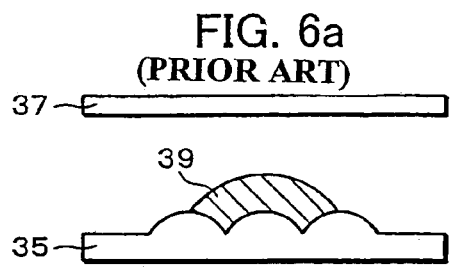
FIG. 6a is a front view showing a step for the manufacture of the conventional micro-lens array substrate.
Figure 6B:
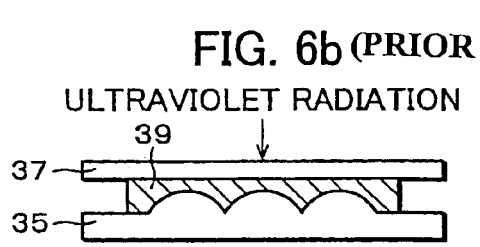
FIG. 6b is a front view showing a step for the manufacture of the conventional micro-lens array substrate.
Figure 6C:
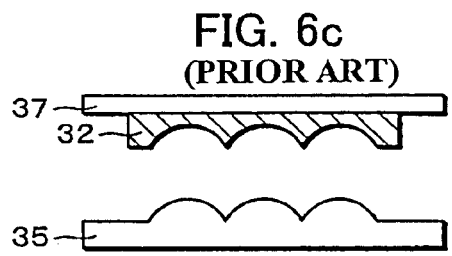
FIG. 6c is a front view showing a step for the manufacture of the conventional micro-lens array substrate.
Figure 6D:
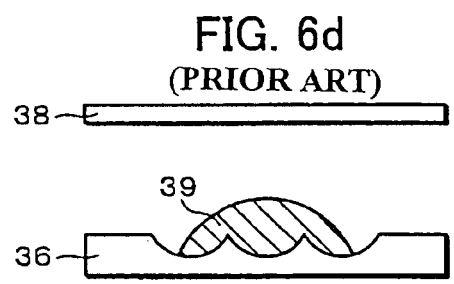
FIG. 6d is a front view showing a step for the manufacture of the conventional micro-lens array substrate.
Figure 6E:
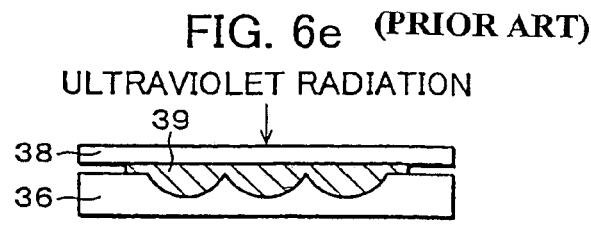
FIG. 6e is a front view showing a step for the manufacture of the conventional micro-lens array substrate.
Figure 6F:
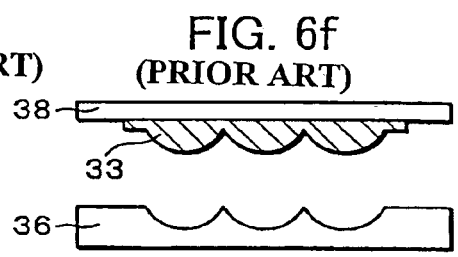
FIG. 6f is a front view showing a step for the manufacture of the conventional micro-lens array substrate.
Figure 6G:
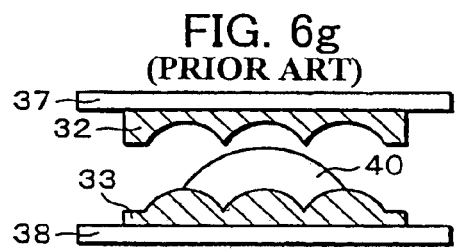
FIG. 6g is a front view showing a step for the manufacture of the conventional micro-lens array substrate.
Figure 6H:
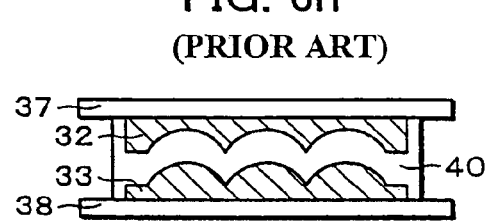
FIG. 6h is a front view showing a step for the manufacture of the conventional micro-lens array substrate.
Figure 7A:
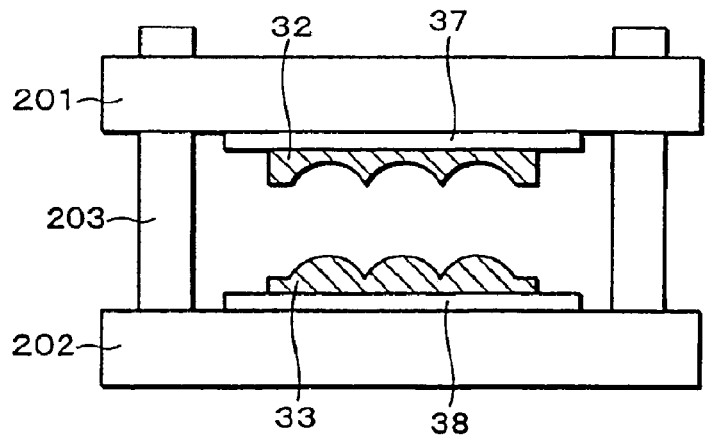
FIG. 7a is a front view showing a step for the manufacture of the conventional micro-lens array substrate, using die sets.
Figure 7B:
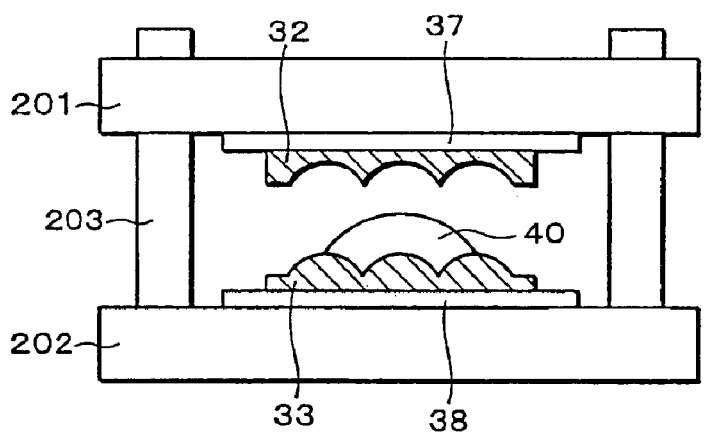
FIG. 7b is a front view showing a step for the manufacture of the conventional micro-lens array substrate, using die sets.
Figure 7C:
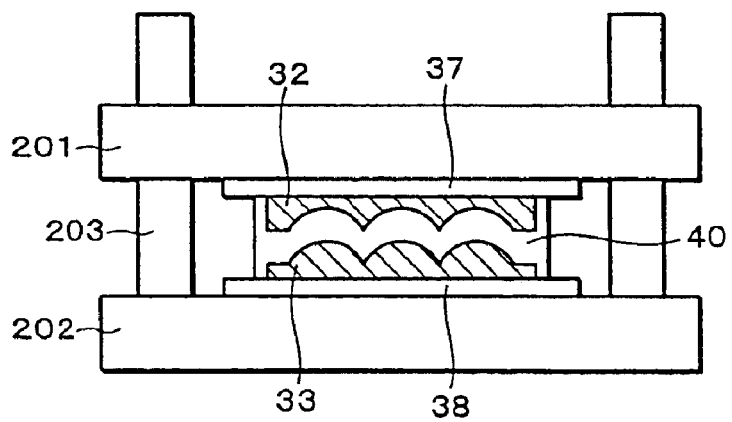
FIG. 7c is a front view showing a step for the manufacture of the conventional micro-lens array substrate, using die sets.
Figure 8A:
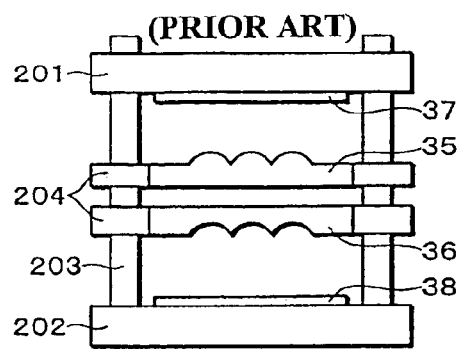
FIG. 8a is a front view showing another step for the manufacture of the conventional micro-lens array substrate, using die sets.
Figure 8D:
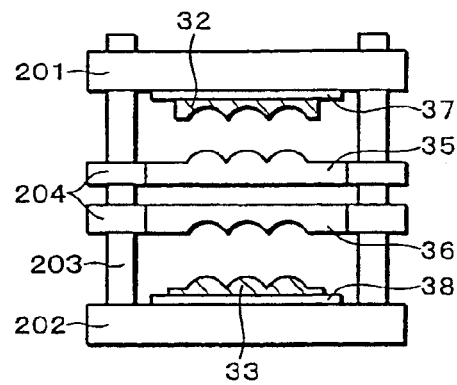
FIG. 8d is a front view showing another step for the manufacture of the conventional micro-lens array substrate, using die sets.
Figure 8B:
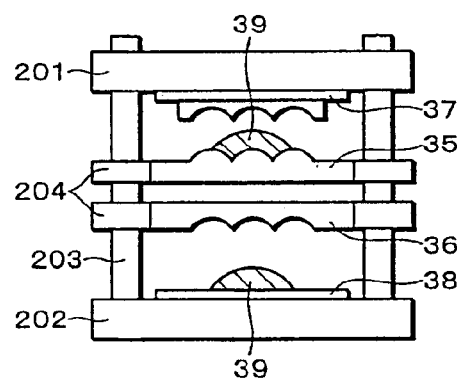
FIG. 8b is a front view showing another step for the manufacture of the conventional micro-lens array substrate, using die sets.
Figure 8E:
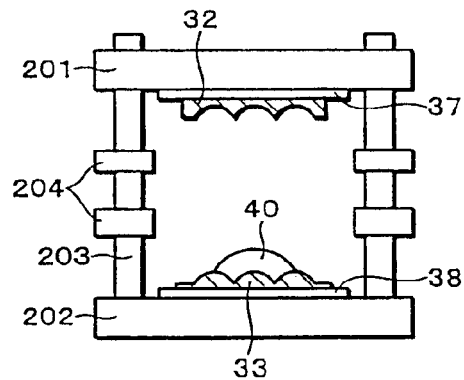
FIG. 8e is a front view showing another step for the manufacture of the conventional micro-lens array substrate, using die sets.
Figure 8C:
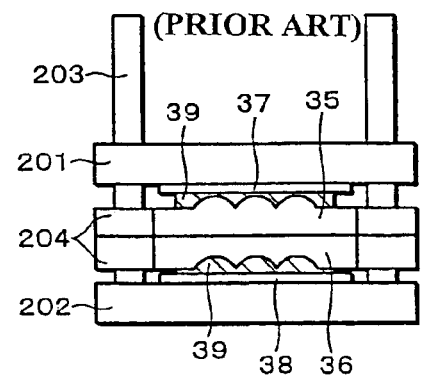
FIG. 8c is a front view showing another step for the manufacture of the conventional micro-lens array substrate, using die sets.
Figure 8F:
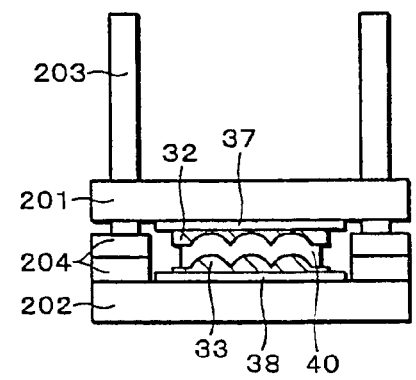
FIG. 8f is a front view showing another step for the manufacture of the conventional micro-lens array substrate, using die sets.

The following will describe one embodiment of the present invention with reference to FIGS. 1a through 1f and FIGS. 2a through 2c.

In an apparatus for manufacturing a micro-lens array substrate according to the present embodiment in which micro-lens arrays each of which is made of light transmitting resin are formed respectively on a pair of transparent substrates facing each other, and another light transmitting resin is fixed between the micro-lens arrays to manufacture a micro-lens arrays substrate, the apparatus includes: first holding means and second holding means for holding the pair of transparent substrates so that they face each other; stamper holding means for holding a stamper which is provided between the pair of transparent substrates, the stamper formed with micro-lens array patterns; a restriction member for restricting movements of the first holding means, the second holding means, and the stamper holding means to the direction vertical to a substrate surface of one transparent substrate, the stamper holding means is adapted so that the stamper can be removed from between the first holding means and the second holding means, and the stamper has a first micro-lens array pattern formed on one surface of the stamper and a second micro-lens array pattern formed on other surface of the stamper.

The following will describe the apparatus for manufacturing a micro-lens array substrate according to the present embodiment as die sets 100 shown in FIGS. 2a and 2b. The die sets, which is a molding jig, is arranged so that at least one of an upper stage and a lower stage can move along a guide pole with a high degree of accuracy.

FIGS. 2a and 2b show a structure of the die sets 100 (the apparatus for manufacturing a micro-lens array substrate) in the present embodiment. Specifically, the die sets 100 includes an upper stage 101 (first holding means), a lower stage 102 (second holding means), a middle stage 104 (stamper holding means), a stamper 1, and a guide pole 103 (restriction member)

The upper stage 101 is adapted to hold a first transparent substrate 2. The lower stage 102 is adapted to hold a second transparent substrate 3. More specifically, the first transparent substrate 2 is set on a substrate setting face of the upper stage 101, and the second transparent substrate 3 is set on a substrate setting face of the lower stage 102. The substrate setting face of the upper stage 101 and the substrate setting face of the lower stage 102 are flat, and they face so as to be parallel to each other. Additionally, the first transparent substrate 2 and the second transparent substrate 3 are not especially limited, and any materials may be adopted provided that they have light transmittance state. They may be realized by the same material or by respectively different materials. Examples of the first transparent substrate 2 and the second transparent substrate 3 include a glass substrate and a plastic substrate.

The upper stage 101 and the lower stage 102 are arranged so as to be movable along at least one guide pole 103 in the vertical direction (up and down direction) to a substrate surface of the first transparent substrate 2. That is, the die sets 100 is arranged so that the first transparent substrate 2 and the second transparent substrate 3 can always move in a state where they satisfy a parallel relation between them. Note that, the substrate surface of the first transparent substrate 2 indicates the substrate setting face.

The middle stage 104 holds the stamper 1. More specifically, the middle stage 104 holds the stamper 1 so that the stamper 1 is parallel to the first transparent substrate 2 and the second transparent substrate 3. The middle stage 104 is attached to the guide pole 103 and is provided between the upper stage 101 and the lower stage 102. In the present embodiment, the middle stage 104 is attached to the guide pole 103 with a position of the middle stage 104 fixed. More specifically, the middle stage 104 is attached so as not to move in the up and down direction along the guide pole 103. In addition, the middle stage 104 is provided so as to be able to pivot upon one guide pole 103. That is, the middle stage 104 is provided pivotably without moving in the up and down direction along the guide pole 103. The middle stage 104 holds the stamper 1. More specifically, the middle stage 104 holds the stamper 1 so that the stamper 1 can be disposed between the first transparent substrate 2 and the second transparent substrate 3. Therefore, as the middle stage 104, the stamper 1 can pivot upon one guide pole 103. The first transparent substrate 2 and the second transparent substrate 3 always move so that they satisfy a parallel relation between them with respect to the stamper 1.

Note that, the following description may be given on the basis that as seen from the middle stage 104, the direction in which the upper stage 101 is provided is an upward direction, the direction in which the lower stage 102 is provided is a downward direction, and the direction orthogonal to a guide pole extending direction is a lateral direction. Therefore, the stamper 1 can pivot in the lateral direction.

The stamper 1 according to the present embodiment will be described. The stamper 1 includes micro-lens array patterns formed on both surfaces of the stamper 1. Specifically, a first micro-lens array pattern is formed on a surface of the stamper 1 facing the first transparent substrate 2. A second micro-lens array pattern is formed on a surface of the stamper 1 facing the second transparent substrate 3. The first and second micro-lens array patterns, which are patterns for making up micro-lens arrays, are provided with reversal patterns of micro-lens arrays.

Between the first transparent substrate 2 and the first micro-lens array pattern filled is a first light transmitting resin, and the first transparent substrate 2 and the first micro-lens array pattern are contacted via the first light transmitting resin, thereby forming a first micro-lens array 2a. Similarly, between the second transparent substrate 3 and the second micro-lens array pattern filled is a second light transmitting resin, and the second transparent substrate 3 and the second micro-lens array pattern closely contacted via the second light transmitting resin, thereby forming a second micro-lens array 3a.

Then, the first micro-lens array 2a and the second micro-lens array 3a are contacted via a third light transmitting resin, thereby realizing a micro-lens array substrate according to the present embodiment.

Material for the first, second, third light transmitting resins is not especially limited, and any materials may be adopted provided that they are resin of light transmittance state. Specifically, ultraviolet-hardening resin and heat-hardening resin, for example, can be adopted. Note that, the first and second light transmitting resins may be realized by the same material or by respectively different materials.

Further, in the present embodiment, as shown in FIGS. 2b and 2c, the middle stage 104 holding the stamper 1 is caused to move in the lateral direction. As compared with the arrangement in which the stamper 1 is removed by moving it in the up and down direction, i.e. in the direction orthogonal to the transparent substrate, the arrangement of the present embodiment requires less space in the up and down direction and enables reduction in a moving distance between the first transparent substrate 2 and the second transparent substrate 3. This makes it possible to minimize deviation in optical axes and inclination of micro-lens arrays caused during movement of the first transparent substrate 2 and the second transparent substrate 3.

The following description will be given based on the method for manufacturing a micro-lens array substrate according to the present embodiment.

In the method for manufacturing a micro-lens array substrate according to the present embodiment, the stamper 1 formed with micro-lens array patterns is disposed between the first transparent substrate 2 and the second transparent substrate 3 which are held on the die sets, micro-lens arrays which are respectively made of the first and second light transmitting resins are formed respectively between the first transparent substrate 2 and the stamper 1 and between the second transparent substrate 3 and the stamper 1, and thereafter, the stamper 1 is removed to fix the third light transmitting resin between the micro-lens arrays, thereby manufacturing a micro-lens array substrate, the method including:

a resin supplying step of utilizing the stamper 1 including the first micro-lens array pattern formed on one surface of it and the second micro-lens array pattern on the other surface of it, supplying the first light transmitting resin and the second light transmitting resin respectively between the first transparent substrate 2 and the surface of the stamper 1 on which the first micro-lens array pattern is formed and between the second transparent substrate 3 and the surface of the stamper 1 on which the second micro-lens array pattern is formed;

a contacting step of contacting the first transparent substrate 2 and the stamper 1 via the first light transmitting resin and contacting the second transparent substrate 3 and the stamper 1 via the second light transmitting resin;

a forming step of hardening the first and second light transmitting resins to form the respective micro-lens arrays;

a separating step of separating the first transparent substrate 2 and the second transparent substrate 3 from the stamper 1;

a removing step of removing the stamper 1 from between the first transparent substrate 2 and the second transparent substrate 3;

a third resin supplying step of supplying the third light transmitting resin between the surfaces of the first transparent substrate 2 and the second transparent substrate 3 where the respective micro-lens arrays are formed;

a substrate contacting step of contacting the first transparent substrate 2 and the second transparent substrate 3 via the third light transmitting resin; and a third resin hardening step of hardening the third light transmitting resin.

The following will describe the method for manufacturing a micro-lens array substrate according to the present embodiment with reference to FIGS. 1a through 1f.

It should be noted that the following description will be given on the basis that the same material is adopted for the first and second light transmitting resins. Specifically, the description will be given about the arrangement in which for the first and second light transmitting resins adopted is a first ultraviolet-hardening resin 4, and for the third light transmitting resin adopted is a second ultraviolet-hardening resin 5.

In the method for manufacturing a micro-lens array substrate according to the present embodiment, as shown in FIG. 1a, the stamper 1 with micro-lens array patterns formed on both surfaces of the stamper 1, the first transparent substrate 2, and the second transparent substrate 3 are held with their parallelism maintained at the respectively predetermined positions X. In other words, when the first transparent substrate 2 and the second transparent substrate 3 exist at the respectively predetermined positions X, the stamper 1, the first transparent substrate 2, and the second transparent substrate 3 are disposed parallel to one another. The stamper 1 is fixed pivotably without moving in the up and down direction, and the first transparent substrate 2 and the second transparent substrate 3 are movable from the respectively predetermined positions X to the position of the stamper 1.

First of all, as shown in FIG. 1a, when the first transparent substrate 2 and the second transparent substrate 3 are disposed at the respectively predetermined positions X, the first ultraviolet-hardening resins 4 are supplied respectively on the stamper 1 and the second transparent substrate 3 (resin supplying step). Then, the first transparent substrate 2 and the second transparent substrate 3 are pressed to the stamper 1 so that the first ultraviolet-hardening resins 4 can spread between the first transparent substrate 2 and the stamper 1 and between the second transparent substrate 3 and the stamper 1 (contacting step). Subsequently, as shown in FIG. 1b, the first ultraviolet-hardening resins 4 are hardened by ultraviolet irradiation through the first transparent substrate 2 and the second transparent substrate 3. This forms the first micro-lens array 2a and the second micro-lens array 3a on the first transparent substrate 2 and the second transparent substrate 3, respectively (forming step).

Next, as shown in FIG. 1c, the first transparent substrate 2 and the second transparent substrate 3 are caused to move at the respectively predetermined positions X to separate the first ultraviolet-hardening resins 4 from the stamper 1 (separating step). That is, in the separating step, the micro-lens arrays 2a and 3a are separated from the stamper 1. Then, as shown in FIG. 1d, the stamper 1 is removed from between the first transparent substrate 2 and the second transparent substrate 3 (removing step). Thereafter, as shown in FIG. 1e, the second ultraviolet-hardening resin 5 is supplied on the second micro-lens array 3a which has been formed on the second transparent substrate 3 (third resin supplying step). Next, the first transparent substrate 2 is pressed to the second transparent substrate 3 so that the second ultraviolet-hardening resin 5 can spread between the first micro-lens array 2a formed on the first transparent substrate 2 and the second micro-lens array 3a formed on the second transparent substrate 3 (substrate contacting step). Then, as shown in FIG. 1f, the second ultraviolet-hardening resin 5 is hardened by ultraviolet irradiation, and the first transparent substrate 2 and the second transparent substrate 3 are joined together, thereby manufacturing a micro-lens array substrate (third resin hardening step).

At this moment, in each of the steps, the first transparent substrate 2 and the second transparent substrate 3 move from or to the respective predetermined positions X with their parallelism and respective positions maintained. As such a method for moving the stamper 1, the first transparent substrate 2, and the second transparent substrate 3 with their parallelism and relative positions maintained adopted is, for example, a method of fixing them to die sets or the like used for molding.

Note that, examples of a manufacturing method of the stamper 1 formed with micro-lens array patterns on both surfaces of the stamper 1 include the following three methods. Specifically, in the first method, the stamper 1 is formed in such a manner that and a resist pattern for the first micro-lens array pattern and an alignment mark is formed on one surface of a substrate by photolithography, and thereafter, the micro-lens array pattern and the alignment mark are formed on the surface of the substrate by RIE (Reactive-Ion-Etching), wet etching, or the like, and the same steps as described above are also carried out on the other surface of the substrate.

In the second method, the stamper 1 is formed in such a manner that two substrates, each of which has a micro-lens array pattern and an alignment pattern formed on its one surface by the same method as described above, are bonded together.

In the third method, the stamper 1 is formed in such a manner that a substrate where a first micro-lens array pattern and an alignment pattern has been formed on one surface of the substrate by the same method as described above is prepared, a resist and ultraviolet-hardening resin are applied onto the other surface of the substrate where the micro-lens array pattern is not formed, light from an exposure light source is caused to enter onto the other surface from the side of the first micro-lens array pattern, and a second micro-lens array pattern is formed by self-alignment exposure using light focusing characteristics of the first micro-lens array pattern, thereby forming the stamper 1.

The first and second methods for manufacturing the stamper 1 require alignment of the second micro-lens array pattern with reference to the alignment mark formed together with the first micro-lens array pattern. However, this alignment operation, which is only carried out in preparing the stamper 1, does not affect the mass production of the micro-lens array substrate because the alignment operation is not necessary in generating the micro-lens array substrate.

Moreover, other than the above-described photolithography, examples of a method for forming a micro-lens array on the transparent substrate includes: (1) a reflowing method of forming a lens pattern by dropping and heating resist and heat-hardening resin on the transparent substrate; (2) 2P (Photo-Polymerization) of forming a lens pattern by using ultraviolet-hardening resin on the transparent substrate; (3) a method of forming a lens pattern by machine work; and other various methods. From among these methods, a suitable method may be selected in accordance with characteristics of resin adopted for manufacture of a micro-lens array substrate.

The above description has given a method of contacting the first transparent substrate 2 and the stamper 1 via the ultraviolet-hardening resin 4 and contacting the second transparent substrate 3 and the stamper via the ultraviolet-hardening resin 4 after supplying the first ultraviolet-hardening resins 4 between the first transparent substrate 2 and the stamper 1 and between the second transparent substrate 3 and the stamper 1. However, a method for forming the first micro-lens array 2a and the second micro-lens array 3a is not limited to the above-described method. For example, they may be formed in such a manner that ultraviolet-hardening resins (light transmitting resin) are filled in spaces, respectively adjusted corresponding to a thickness of a micro-lens array that will be finally formed, between the first transparent substrate 2 and the stamper 1 and between the second transparent substrate 3 and the stamper 1.

As described above, in the method for manufacturing a micro-lens array substrate according to the present embodiment, the stamper 1 formed with micro-lens array patterns is disposed between the first transparent substrate 2 and the second transparent substrate 3 which are held on the die sets, facing each other, the first micro-lens array 2a and the second micro-lens array 3a which are made of the first ultraviolet-hardening resin 4 are formed respectively between the first transparent substrate 2 and the stamper 1 and between the second transparent substrate 3 and the stamper 1, and thereafter, the stamper 1 is removed to fix the third light transmitting resin between the first micro-lens array 2a and the second micro-lens array 3a, thereby manufacturing a micro-lens array substrate, the method including:
a first array forming step of utilizing the stamper 1 having the first micro-lens array pattern formed on one surface of the stamper 1 and the second micro-lens array pattern on the other surface of the stamper 1, forming the first micro-lens array 2a made of the first ultraviolet-hardening resin 4 between the first transparent substrate 2 and the stamper 1;
a second array forming step of forming the second micro-lens array 3a made of the first ultraviolet-hardening resin 4 between the second transparent substrate 3 and the stamper 1; a taking-away step (separating step and removing step) of separating and removing the stamper 1 from between the first micro-lens array 2a and the second micro-lens array 3a; and a fixing step (third resin hardening step) of fixing the second ultraviolet-hardening resin 5 between the first micro-lens array 2a and the second micro-lens array 3a.

More specifically, in the manufacturing method of a micro-lens array substrate, the stamper 1 formed with micro-lens array patterns is disposed between the first transparent substrate 2 and the second transparent substrate 3 which are held on the die sets 100, facing each other, the first micro-lens array 2a and the second micro-lens array 3a which are respectively made of the first and second light transmitting resins (first ultraviolet-hardening resin 4) are formed respectively between the first transparent substrate 2 and the stamper 1 and between the second transparent substrate 3 and the stamper 1, and thereafter, the third light transmitting resin (second ultraviolet-hardening resin 5) is fixed between the first micro-lens array 2a and the second micro-lens array 3a, thereby manufacturing a micro-lens array substrate, the method including:

a first resin supplying step of utilizing the stamper 1 including the first micro-lens array pattern formed on one surface of the stamper 1 and the second micro-lens array pattern on the other surface of the stamper 1, supplying the first light transmitting resin (first ultraviolet-hardening resin 4) between the first transparent substrate 2 and the surface of the stamper 1 where the first micro-lens array pattern is formed,;

a second resin supplying step of supplying the second light transmitting resin (first ultraviolet-hardening resin 4) between the second transparent substrate 3 and the surface of the stamper 1 where the second micro-lens array pattern is formed;

a first resin contacting step of contacting the first transparent substrate 2 and the stamper 1 via the first light transmitting resin (first ultraviolet-hardening resin 4);

a second resin contacting step of contacting the second transparent substrate 3 and the stamper 1 via the second light transmitting resin (first ultraviolet-hardening resin 4);

a forming step of hardening the first and second light transmitting resins (first ultraviolet-hardening resin 4) to form the respective micro-lens arrays;

a separating step of separating from the stamper 1 the respective micro-lens arrays formed on the first transparent substrate 2 and the second transparent substrate 3;

a removing step of removing the stamper 1 from between the respective micro-lens arrays formed on the first transparent substrate 2 and the second transparent substrate 3;

a third resin supplying step of supplying the third light transmitting resin (second ultraviolet-hardening resin 5) between the surfaces of the first transparent substrate 2 and the second transparent substrate 3 where the respective micro-lens arrays are formed;

a third resin contacting step of contacting the first transparent substrate 2 and the second transparent substrate 3 via the third light transmitting resin (second ultraviolet-hardening resin 5); and a third resin hardening step of hardening the third light transmitting resin (second ultraviolet-hardening resin 5).

Thus, after the first transparent substrate 2 and the second transparent substrate 3 are pressed via the first ultraviolet-hardening resins 4 to the stamper 1 with micro-lens array patterns formed on both surfaces of the stamper 1, i.e. after the first ultraviolet-hardening resins 4 are supplied between the first transparent substrate 2 and the stamper 1 and between the second transparent substrate 3 and the stamper 1, the first ultraviolet-hardening resins 4 are hardened by ultraviolet irradiation to the first transparent substrate 2 and the second transparent substrate 3. After hardening the first ultraviolet-hardening resins 4, the first transparent substrate 2 and the second transparent substrate 3 are separated from the stamper 1 to form the first micro-lens array 2a and the second micro-lens array 3a on the first transparent substrate 2 and the second transparent substrate 3, respectively. Then, the first transparent substrate 2 and the second transparent substrate 3 are pressed to each other via the second ultraviolet-hardening resin 5, and the second ultraviolet-hardening resin 5 is hardened by ultraviolet irradiation, thereby manufacturing a micro-lens array substrate. This makes it possible to manufacture the double-layer structured micro-lens array substrate by a small number of simple steps.

Additionally, in the above manufacturing method, it is more preferable that the first transparent substrate 2, the second transparent substrate 3, and the stamper 1 are adapted to be held at the respective predetermined positions in the resin supplying steps and the separating step.

That is, it is more preferable that the first transparent substrate 2, the second transparent substrate 3, and the stamper 1 with micro-lens arrays formed on both surfaces of the stamper 1 are held with their parallelism and relative positions maintained, and that the first transparent substrate 2 and the second transparent substrate 3 are caused to move from or to the respective predetermined positions X for each of the steps. In other words, the first transparent substrate 2 and the second transparent substrate 3 move from or to the respective positions where parallelism of the first and second transparent substrates 2 and 3 can be maintained, which have been established in advance. For example, this makes it possible to manufacture a micro-lens array substrate, keeping a high degree of accuracy in parallelism and relative positions of the first micro-lens array 2a and the second micro-lens array 3a formed respectively on the first transparent substrate 2 and the second transparent substrate 3, without each time of alignments even in a continuous manufacture of the micro-lens array substrate. This can realize an efficient mass production of the micro-lens array substrate.

Further, deviation in the relative positions of the first transparent substrate 2 and the second transparent substrate 3 in an initial state, for example, has no influence on the relative positions of the first micro-lens array 2a and the second micro-lens array 3a. This eliminates the need for highly accurate positioning of the substrates, thus reducing the time required for manufacture of the micro-lens array substrate.

Further, ultraviolet-hardening resins between which difference in refraction index after hardened is not less than 0.1, used for the first ultraviolet-hardening resin 4 and the second ultraviolet-hardening resin 5, enable increase in light-focusing characteristics of the first micro-lens array 2a and in characteristics of the second micro-lens array 3a refracting the respective optical axes of light beams focused onto the first micro-lens array 2a. This makes it possible to further improve the utilization efficiency of light and to realize high resolution due to reduction in mixed colors of light beams. Further, it is more preferable that a refraction index of the second ultraviolet-hardening resin 5 after hardened is at least 0.1 higher than that of the first ultraviolet-hardening resin 4 after hardened.

Additionally, it is preferable that the stamper 1 used in the present embodiment has a thickness of 1 mm to 20 mm. In the case where the thickness of the stamper 1 is less than 1 mm, damage to the stamper 1 could occur when the first transparent substrate 2 and the second transparent substrate 3 are separated from the stamper 1. On the other hand, in the case where the thickness of the stamper 1 is more than 20 mm, moving distances from the respective predetermined positions X of the first transparent substrate 2 and the second transparent substrate 3 are increased. This could decrease an accuracy in parallelism and relative positions of the first transparent substrate 2 and the second transparent substrate 3. The moving distance indicates a distance from the position where the substrate is set to the position where two substrates are joined together in the end.

Further, in the above-described manufacturing method of a micro-lens array substrate of the present embodiment, the same first ultraviolet-hardening resin 4 has been adopted for the first micro-lens array 2a and the second micro-lens array 3a. However, it is not always necessary to adopt the same resin for the first micro-lens array 2a and the second micro-lens array 3a. For example, different ultraviolet-hardening resins may be adopted for formation of the respective micro-lens arrays. In this case, it is more preferable that the above resins are selected so that a refraction index of the second ultraviolet-hardening resin 5 after hardened is higher than refraction indices of the other two light transmitting resins.

Further, formation of the liquid crystal panel section is not described in the present embodiment. However, for example, an alignment mark can be formed on the micro-lens array substrate by forming a micro-lens array pattern together with an alignment mark on the stamper 1. Then, by forming (mounting) the liquid crystal panel section with reference to the alignment mark, it is possible to carry out alignment of the micro-lens arrays and the liquid crystal panel section.

Still further, although the method of causing the first transparent substrate 2 and the second transparent substrate 3 to move in the up and down direction with respect to the stamper 1 is described above, the following methods, for example, may be adopted: (1) a method of causing the stamper 1 and the second transparent substrate 3 to move with respect to the first transparent substrate 2; and (2) a method of causing the stamper 1 and the first transparent substrate 2 to move with respect to the second transparent substrate 3. However, in manufacturing the micro-array substrate, the stamper 1 must be removed from between the first transparent substrate 2 and the second transparent substrate 3. In the above two methods, when the stamper 1 is caused to move up and down, the stamper 1 must be moved with high accuracy in the up and down direction and in the lateral direction, resulting in a complicated structure of the apparatus for manufacturing a micro-lens array substrate. Because of this, the most preferable is the method of causing the first transparent substrate 2 and the second transparent substrate 3 to move with respect to the stamper 1.

Yet further, in the removing step, it is more preferable that the stamper 1 is removed in the direction orthogonal to the movement direction (removal direction) of the first transparent substrate 2 (or the second transparent substrate 3) in the removing step. Downsizing of the apparatus for manufacturing a micro-lens array substrate by removing the stamper 1 in the direction orthogonal to the movement direction of the first transparent substrate 2 or the second transparent substrate 3.

Further, an arrangement in which the number of the guide pole 103 is two is given in the above description. However, the number of a guide pole is not especially limited, and the guide pole may take any number, provided that the first transparent substrate 2, the second transparent substrate 3, and the stamper 1 can move in parallel with one another.

In the manufacture of the micro-lens arrays substrate, when the third light transmitting resin is fixed between the respective micro-lens arrays, the stamper 1 must be taken away from between the first transparent substrate 2 and the second transparent 3. Then, when the next micro-lens array substrate is manufactured, the stamper 1 must be attached (set) again between the first transparent substrate 2 and the second transparent substrate 3. In the present embodiment, the stamper 1 is attached so as to pivot in a plane orthogonal to the movement direction of the first transparent substrate 2 (second transparent substrate 3). Specifically, the stamper 1 rotates in a state where one end of the stamper 1 held by the middle stage 104 is held (fixed) to the die sets 100, i.e. in a state where one end of the stamper 1 held by the middle stage 104 is attached to the die sets 100. Therefore, reattachment of the stamper 1 is completed just by attaching the other end of the stamper 1 which is not attached to the die sets 100 to other middle stage 104 to which the stamper 1 is not attached in the die sets 100. Thus, it is possible to carry out positioning of the first transparent substrate 2, the second transparent substrate 3, and the stamper 1 more easily than ever.

Further, in the method for manufacturing a micro-lens array substrate according to the present embodiment in which the stamper formed with micro-lens array patterns is disposed between the first transparent substrate 2 and the second transparent substrate 3 facing each other, the micro-lens arrays 2a and 3a which are made of the first light transmitting resin 4 and the second light transmitting resin 4 are formed respectively, and thereafter, the stamper is removed to fix the third light transmitting resin 5 between the micro-lens arrays 2a and 3a, thereby manufacturing a micro-lens array substrate, movement of the second transparent substrate is restricted only to the direction orthogonal to a substrate surface of the first transparent substrate, and movement of the first transparent substrate is restricted only to the direction orthogonal to a substrate surface of the second transparent substrate, and the stamper has the first micro-lens array pattern formed on one surface of the stamper and the second micro-lens array pattern on the other surface of the stamper.

Yet further, in the method for manufacturing a micro-lens array substrate according to the present embodiment in which the stamper having the micro-lens array patterns is disposed between a pair of transparent substrates being held on the die sets and facing each other, and the stamper is removed, after forming the micro-lens arrays 2a and 3a which are made of light transmitting resin respectively between one transparent substrate and the stamper and between the other transparent substrate and the stamper, so as to fix other light transmitting resin 5 between the micro-lens arrays, thereby manufacturing a micro-lens array substrate, the stamper has the first micro-lens array pattern formed on one surface of the stamper and the second micro-lens array pattern on the other surface of the stamper.

According to the above arrangement, the micro-lens array substrate is manufactured utilizing the stamper 1 having the micro-lens array patterns on both surfaces of the stamper 1 with respect to the transparent substrates held on the die sets 100. Specifically, the first transparent substrate 2 and the second transparent substrate 3 are disposed so as to face each other, the stamper 1 is disposed between the first transparent substrate 2 and the second transparent substrate 3, and the stamper 1 is taken away after the micro-lens arrays which are made of light transmitting resin are formed on the respective transparent substrates. Then, the third light transmitting resin is fixed between the two micro-lens arrays, thereby manufacturing a micro-lens array substrate. That is, a micro-lens made of the third light transmitting resin 5 is formed between the first micro-lens array 2a and the second micro-lens array 3a. At this moment, the stamper 1 has micro-lens array patterns on both surfaces of the stamper 1. This eliminates the need for positioning of the respective lens array patterns.

Therefore, as compared with the conventional arrangement in which a micro-lens array substrate is manufactured utilizing the respectively different stampers, it is not necessary to carry out positioning of the stampers when the stamper is attached to the die sets. This makes it possible to manufacture the above substrate more easily with less steps for the manufacture. In addition, it is possible to manufacture the substrate more easily with less steps for the manufacture than ever, thus allowing mass production of the substrate more easily.

In the method for manufacturing a micro-lens array substrate of the present invention, it is more preferable that the first transparent substrate 2 and the second transparent substrate 3 are caused to move with respect to the stamper 1 so that the first transparent substrate 2, the second transparent substrate 3, and the stamper 1 are parallel to one another.

According to the above arrangement, the first transparent substrate 2, the second transparent substrate 3, and the stamper 1 are held so as to be parallel to one another. Therefore, without alignment, it is possible to manufacture a micro-lens array substrate in a state where the micro-lens array 2a formed on the first transparent substrate and the micro-lens array 3a formed on the second transparent substrate maintains a high degree of accuracy in parallelism and relative positions. This allows highly accurate and efficient mass production of a double-layer structured micro-lens array substrate.

In the method for manufacturing a micro-lens array substrate of the present invention, it is more preferable that the micro-lens arrays 2a and 3a which are respectively made of the first and second light transmitting resins are formed in a state where the stamper 1 is set in place.

According to the above arrangement, the first and second transparent substrates are moved in a state where the stamper is set in place, thereby forming the micro-lens arrays 2a and 3a which are respectively made of the first and second light transmitting resins. For example, this makes it possible to carry out alignment of the stamper more easily when the stamper is reattached. This allows easier mass production of a micro-lens array substrate.

In the method for manufacturing a micro-lens array substrate of the present invention, it is more preferable that difference in refraction index between the first and third light transmitting resins 4 and 5 after hardened and/or difference in refraction index between the second and third light transmitting resins 4 and 5 after hardened are not less than 0.1.

According to the above arrangement, difference in refraction index between the first and third light transmitting resins 4 and 5 after hardened and/or difference in refraction index between the second and third light transmitting resins 4 and 5 after hardened are not less than 0.1, thereby enabling increase in light-focusing characteristics of the first micro-lens array 2a and in characteristics of the second micro-lens array 3a refracting the respective optical axes of light beams focused onto the first micro-lens array 2a. This makes it possible to further improve the utilization efficiency of light and to realize high resolution due to reduction in mixed colors of light beams.

In the apparatus for manufacturing a micro-lens array substrate of the present invention, in which micro-lens arrays 2a and 3a which are respectively made of the first light transmitting resin and the second light transmitting resin are formed respectively on the first transparent substrate 2 and the second transparent substrate 3, and the third light transmitting resin 5 is fixed between the micro-lens arrays 2a and 3a to manufacture a micro-lens array substrate, the apparatus includes:

first holding means 101 and second holding means 102 for holding the first and second transparent substrates so that they face each other;

stamper holding means 104 for holding the stamper 1 formed with micro-lens array patterns between the first transparent substrate 2 and the second transparent substrate 3; and a restriction member 103 for restricting movements of the first holding means 101, the second holding means 102, and the stamper holding means 104 to a direction vertical to a substrate surface of the first transparent substrate 2, the stamper holding means 104 is adapted so that the stamper 1 can be removed from between the first holding means 101 and the second holding means 102, and the stamper 1 has the first micro-lens array pattern formed on one surface of the stamper 1 and the second micro-lens array pattern formed on other surface of the stamper 1.

According to the above arrangement, different micro-lens array patterns are formed on both surfaces of the stamper 1. Therefore, as compared with the conventional manufacturing apparatus, the above-arranged manufacturing apparatus eliminates the need for alignment of the micro-lens array patterns. This makes it possible to manufacture a micro-lens array substrate more easily than ever.

In the apparatus for manufacturing a micro-lens array substrate of the present invention, it is more preferable that the stamper holding means 104 hold the stamper 1 so that the stamper 1 can pivot upon a direction vertical to the substrate surface of the first transparent substrate 2.

According to the above arrangement, the stamper holding means 104 hold the stamper 1 so that the stamper 1 can pivot upon the direction vertical to the substrate surface of the first transparent substrate 2. With this arrangement, for example, when the first and second transparent substrates 2 and 3 formed with micro-lens arrays are joined together with the third light transmitting resin 5, the stamper 1 can be removed from between the first and second transparent substrates 2 and 3 by pivoting the stamper 1. Therefore, the above arrangement allows easier removal of the stamper 1 and downsizing of the apparatus, as compared with the conventional arrangement in which the stamper is taken away to remove. Further, for example, when the stamper 1 is disposed between the first and second transparent substrates 2 and 3, the stamper 1 can be disposed accurately in an easier manner because one end of the stamper 1 is held by the stamper holding means 104. Besides, since the stamper 1 is removed in the parallel direction to the substrate surface of the first transparent substrate 2, moving distances of the first and second transparent substrates 2 and 3 can be shortened when the first and second transparent substrates 2 and 3 are separated from the stamper 1. This makes it possible to minimize deviation in optical axes and inclination of the first and second transparent substrates 2 and 3 caused during movement.

In the apparatus for manufacturing a micro-lens array substrate of the present invention, it is more preferable that the stamper 1 has a thickness of 1 mm to 20 mm.

The stamper 1 has a thickness of 1 mm to 20 mm, thereby preventing damage to the stamper. Further, reduction in the amount of movement of the first and second transparent substrates makes it possible to maintain a high degree of accuracy in parallelism and relative positions of the transparent substrates and the stamper.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A method for manufacturing a micro-lens array substrate, comprising the steps of:
   (1) disposing a stamper having a first micro-lens array pattern formed on one surface of the stamper and a second micro-lens array pattern formed on other surface of the stamper between a first transparent substrate and a second transparent substrate facing each other; and
   (2) removing the stamper, after forming a micro-lens array which is made of a first light transmitting resin between the first transparent substrate and the stamper and forming a micro-lens array which is made of a second light transmitting resin between the second transparent substrate and the stamper, so as to fix a third light transmitting resin between the micro-lens arrays,
   the stamper being removed under a condition where the first transparent substrate and the second transparent substrate maintain a state in which they face each other, movement of the second transparent substrate is restricted to a direction orthogonal to a substrate surface of the first transparent substrate, and movement of the first transparent substrate is restricted to a direction orthogonal to a substrate surface of the second transparent substrate.

2. The method according to claim 1, wherein the first transparent substrate, the second transparent substrate, and the stamper are held so as to be parallel to one another.

3. The method according to claim 1, wherein the micro-lens arrays which are respectively made of the first light transmitting resin and the second light transmitting resin are formed in a state where the stamper is set in place.

4. The method according to claim 1, wherein difference in refraction index between the first and third light transmitting resins after hardened and/or difference in refraction index between the second and third light transmitting resins after hardened are not less than 0.1.

5. The method according to claim 1, wherein a refraction index of the third light transmitting resin after hardened is higher than refraction indices of the first and second light transmitting resins after hardened.

6. The method according to claim 1, wherein at least one of the first light transmitting resin and the second light transmitting resin, and the third light transmitting resin is ultraviolet-hardening resin.

7. The method according to claim 1, wherein the first light transmitting resin and the second light transmitting resin are made of the same material.

8. The method according to claim 1, further comprising:
a resin supplying step of supplying the first light transmitting resin between the first transparent substrate and the surface on which the first micro-lens array pattern is formed and supplying the second light transmitting resin between the second transparent substrate and the surface on which the second micro-lens array pattern is formed;
a contacting step of contacting the first transparent substrate and the stamper via the first light transmitting resin and contacting the second transparent substrate and the stamper via the second light transmitting resin;
a forming step of hardening the first light transmitting resin and the second light transmitting resin to form the respective micro-lens arrays;
a separating step of separating the micro-lens arrays from the stamper;
a removing step of removing the stamper from between the micro-lens arrays;
a third resin supplying step of supplying the third light transmitting resin between the respective surfaces on which the two micro-lens arrays are formed;
a substrate contacting step of contacting the two micro-lens arrays via the third light transmitting resin; and
a third resin hardening step of hardening the third light transmitting resin.

9. A method for manufacturing a micro-lens array substrate, comprising the steps of:
(1) disposing a stamper having a first micro-lens array pattern formed on one surface of the stamper and a second micro-lens array pattern formed on other surface of the stamper between a first transparent substrate and a second transparent substrate being held on die sets and facing each other; and
(2) removing the stamper, after forming a micro-lens array which is made of a first light transmitting resin between the first transparent substrate and the stamper and forming a micro-lens array which is made of a second light transmitting resin between the second transparent substrate and the stamper, so as to fix a third light transmitting resin between the micro-lens arrays.

10. The method according to claim 9, wherein the micro-lens arrays which are respectively made of the first light transmitting resin and the second light transmitting resin are formed in a state where the stamper is set in place.

11. The method according to claim 9, wherein difference in refraction index between the first and third light transmitting resins after hardened and/or difference in refraction index between the second and third light transmitting resins after hardened are not less than 0.1.

12. The method according to claim 9, wherein a refraction index of the third light transmitting resin after hardened is higher than refraction indices of the first and second light transmitting resins after hardened.

13. The method according to claim 9, wherein the first light transmitting resin and the second light transmitting resin are made of the same material.

14. The method according to claim 9, wherein at least one of the first light transmitting resin and the second light transmitting resin, and the third light transmitting resin is ultraviolet-hardening resin.

15. The method according to claim 9, comprising:
a resin supplying step of supplying the first light transmitting resin between the first transparent substrate and the surface on which the first micro-lens array pattern is formed and supplying the second light transmitting resin between the second transparent substrate and the surface on which the second micro-lens array pattern is formed;
a contacting step of contacting the first transparent substrate and the stamper via the first light transmitting resin and contacting the second transparent substrate and the stamper via the second light transmitting resin;
a forming step of hardening the first light transmitting resin and the second light transmitting resin to form the respective micro-lens arrays;
a separating step of separating the two micro-lens arrays from the stamper;
a removing step of removing the stamper from between the two micro-lens arrays;
a third resin supplying step of supplying the third light transmitting resin between the respective surfaces on which the two micro-lens arrays are formed;
a substrate contacting step of contacting the two micro-lens arrays via the third light transmitting resin; and
a third resin hardening step of hardening the third light transmitting resin.

16. An apparatus for manufacturing a micro-lens array substrate, in which micro-lens arrays which are respectively made of a first light transmitting resin and a second light transmitting resin are formed respectively on a first transparent substrate and a second transparent substrate, and a third light transmitting resin is fixed between the micro-lens arrays to manufacture a micro-lens array substrate,
the apparatus comprising:
first holder and second holder for holding the first and second transparent substrates so that they face each other;
a stamper holder for holding a stamper between the first transparent substrate and the second transparent substrate; and
a restriction member for restricting movements of the first holder, the second holder, and the stamper holder to a direction vertical to a substrate surface of the first transparent substrate,
the stamper holder being adapted so that the stamper can be removed from between the first holder and the second holder, the stamper having a first micro-lens array pattern formed on one surface of the stamper and a second micro-lens array pattern formed on other surface of the stamper.

17. The apparatus according to claim 16, wherein the stamper holder is fixed to the restriction member.

18. The apparatus according to claim 16, wherein the stamper holder holds the stamper so that the stamper can pivot upon a direction vertical to the substrate surface of the first transparent substrate.

19. The apparatus according to claim 16, wherein the stamper holder fixes one end of the stamper and holds other end of the stamper removably.

20. The apparatus according to claim 16, wherein the stamper has a thickness of 1 mm to 20 mm.

* * * * *